Figure 1:
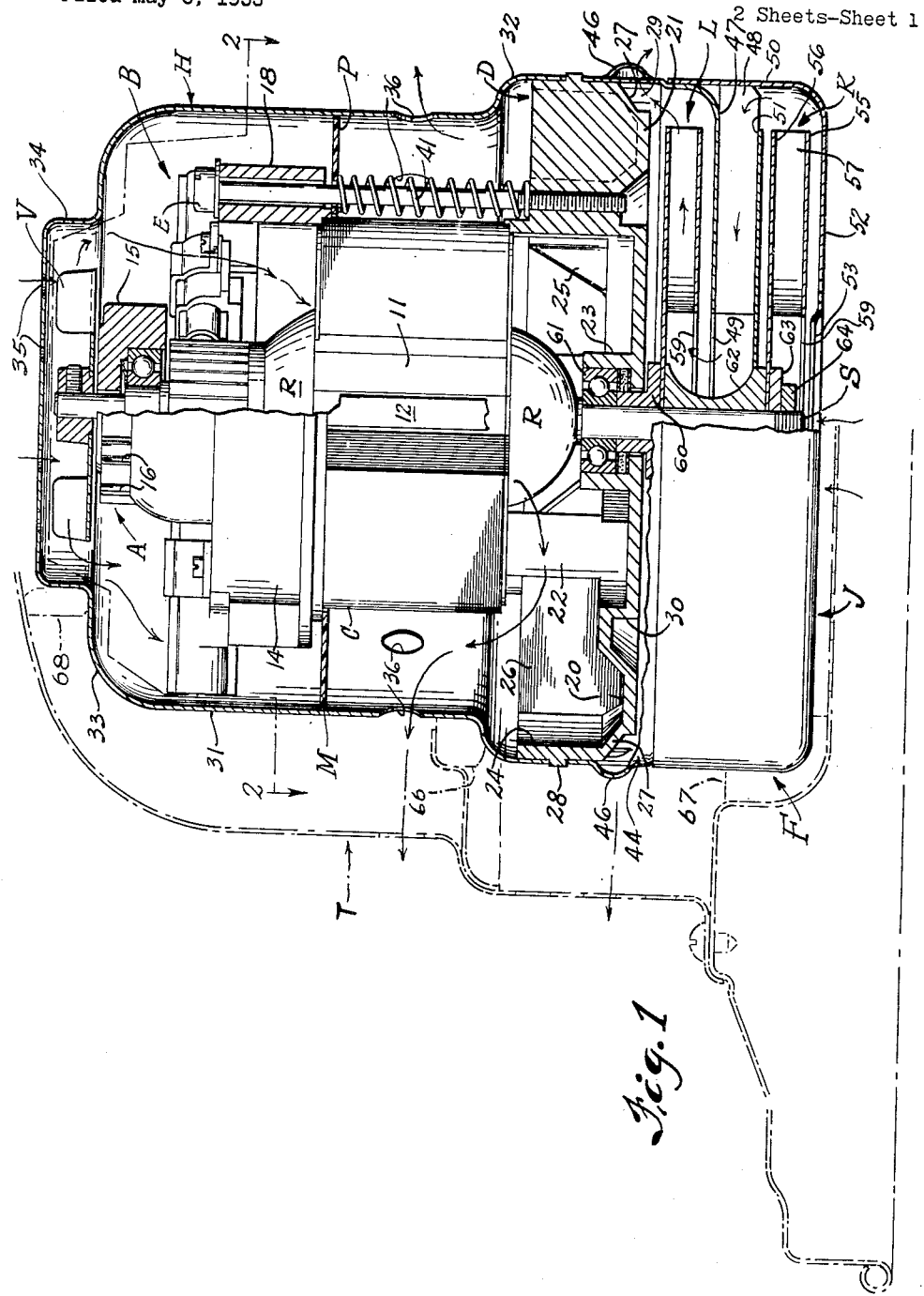

Feb. 4, 1958   J. D. COLE   2,822,122
VACUUM CLEANER MOTOR AND FAN ASSEMBLY
Filed May 6, 1955   2 Sheets-Sheet 1

INVENTOR.
JAMES D. COLE
BY
Golrick & Golrick
ATTORNEYS

Feb. 4, 1958   J. D. COLE   2,822,122
VACUUM CLEANER MOTOR AND FAN ASSEMBLY
Filed May 6, 1955
2 Sheets-Sheet 2

INVENTOR.
JAMES D. COLE
BY
Golrick & Golrick
ATTORNEYS

United States Patent Office 2,822,122
Patented Feb. 4, 1958

2,822,122

VACUUM CLEANER MOTOR AND FAN ASSEMBLY

James D. Cole, Kent, Ohio, assignor, by mesne assignments, to American Machine and Metals, Inc., New York, N. Y., a corporation of Delaware Application May 6, 1955, Serial No. 506,618

5 Claims. (Cl. 230—117)

The present invention relates to an electric motor driven fan assembly, and more particularly to a motor and fan assembly for a vacuum cleaner with means for forced air cooling of the motor by an air stream separate and distinct from that of the fan means used in developing suction for cleaning. However the assembly disclosed herein may be used advantageously in some environments other than vacuum cleaners.

In many electric motor driven fans the air stream moved by the fan unit for attaining some primary function of the unit is also passed over the motor for motor cooling ventilation. In some fields of application liquids, such as water, or other substances deleterious to the motor may be carried by the air stream passing through the fan and motor with consequent damage to the motor. For example in certain upright tank type vacuum cleaners, where a vacuum fan unit is sealed to the top of a tank containing water to catch dirt and particularly fine dust drawn into the cleaner, water is sometimes entrained in the air reaching the fan unit; and where that air stream is used for motor cooling purposes the water may eventually damage the motor. Also in dry filter type tank cleaners at times liquids or other materials sucked in by the cleaner pass through the filter and reach the fan unit and motor with eventual damage to the motor where that air stream is used for motor cooling.

By the present invention there is provided an assembly comprised of an enclosed suction fan in combination with an electric motor components and a housing for the latter, wherein means are provided in the motor housing for forced air motor cooling by an air stream which is kept separate from the cleaning air stream passing through the vacuum or suction unit.

The frame of the motor proper is constituted of the stator core, and two end frame members fitted to opposite ends of the core and clamping bolts passing exteriorly of the core itself to hold the end members in place. One of these frame end members, which in the case of the commutator type motor may carry the motor brushes, includes an annular rim fitted to the end of the stator core and spanned by a bridge or spider structure supporting a rotor shaft bearing for an end of the rotor extending therethrough to mount a motor ventilating fan. The other frame end member includes as an integral structure a disk provided with a rotor shaft bearing socket supporting the other end of the rotor shaft which extends therethrough to mount suction fans, spacing elements projecting toward and fitted to the other end of the stator with air passages therebetween, and a generally cylindrical rim portion supported near the periphery of the disk and preferably offset from said disk toward the motor stator. A cup-like housing for the motor with an outwardly shouldered and cylindrically flanged open end portion fitted to the rim provides a housing spaced from the various elements of the motor. An air intake area opening through the closed end of the cup axially to the cooling fan, a circumferential series of cooling air outlet openings spaced inwardly from the open end of the cup, and a radial partition between air inlet and outlet mounted inward of the first end frame member and extending from the stator core to the motor housing provide air flow space whereby cooling air, drawn in by the motor ventilating fan through the intake openings, is directed about and through the first frame member, between the stator and rotor, radially between the stator core end and the disk portion and spacing elements of the second frame member to pass lengthwise outside the stator core to the exhaust openings. Thus the rotor, stator core and windings, frame end members with bearings therein, and brushes if present, are cooled.

The fan unit proper includes a cup-shaped element with a generally cylindrical wall fitted onto the second frame member rim oposite the motor housing and with the disk portion of the frame member forming a housing enclosing a centrifugal fan element on the rotor shaft. A circumferential series of openings in the cylindrical wall and an axial opening to the fan through a radial wall of the cup shaped element provide outlet and inlet openings for the fan unit.

Thus two separate air paths and air moving means are provided for cooling of the motor and for the primary suction or air moving function of the unit to minimize the possibility of damage to the motor unit by deleterious materials carried by the main suction air stream. Further, in the embodiment of the invention hereinafter described, overall structure and structure of the individual components is such as permits low cost production and ready assembling into a sturdy efficient device.

Figure 2:
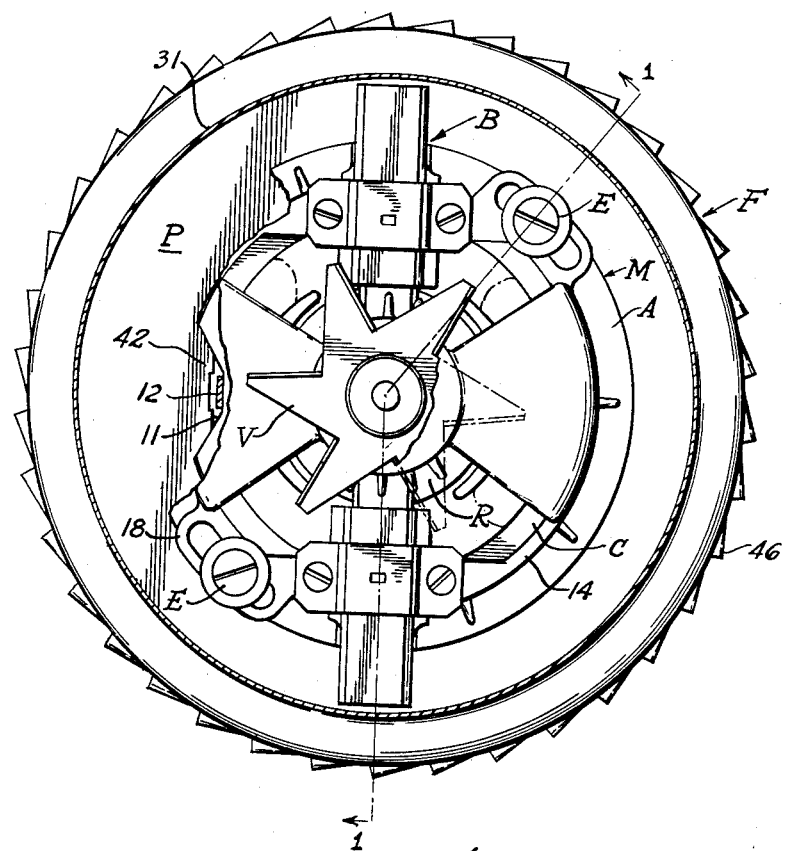

An object of the present invention is then to provide an electric motor and suction fan assembly wherein means are provided for forced motor ventilation by an air stream separate from that of the suction fan. Another object is the provision of an electric motor and fan assembly including housings for the suction fan proper and for the motor elements simply assembled and cheaply manufactured to provide separate and distinct air spaces and paths for cooling of the motor and for suction. Other objects and advantages of the invention will appear from the following description and the drawings wherein:

Fig. 1 is a side view of the assembly with certain portions broken away to show some parts in elevation, and other parts in section taken substantially as indicated by the line 1—1 in Fig. 2; and Fig. 2 is a plan view of the motor and fan unit taken as indicated by line 2—2 in Fig. 1 with certain parts broken away.

In Fig. 1 of the drawings the motor-fan assembly of this invention, comprised of the motor unit or sub-assembly and fan unit designated by the general reference characters M and F respectively is shown mounted in the top portion of an upright tank type vacuum cleaner designated by the dashed outline T. The motor unit M includes as principle elements the stator or field core C; a first frame end member A, here shown carrying brush units B as in a commutator motor, and a second frame end member D which also serves as an end wall of the fan unit; clamping bolts E passing along the outside of the stator core and securing the two frame members thereto to comprise a motor frame; a rotor R whereof the opposite ends of the shaft S are supported in ball-bearing units in bearing receiving sockets of the end members to project through the latter; a cup-shaped housing H surrounding and circumferentially spaced from the stator with open end fitted to and secured to the end member D; a motor ventilating fan V supported on the end of the shaft outboard of the end member A; and a flat annular housing partition plate P surrounding the stator and supported by bolts E. The fan unit includes a generally cylindrical fan housing J here comprised of two cup-shaped members with the open end of one fitted over the closed end of the other to provide two fan chambers for first and second stage centrifugal fan impellers K and L secured on the shaft S, the fan housing being supported on the frame member D as hereinafter described.

The motor stator C is here shown as a two-pole laminated structure of generally cylindrical exterior shape with the laminations riveted together as a unit. The generally cylindrical exterior of the stator is interrupted by two diametrically related longitudinally directed flat-bottomed trough shaped grooves 11 to receive insulated metal strips or clips 12, the looped ends of which secure the field coil ends in position. The general electrical connections and wiring for the motor, which may be conventional, are here omitted for clarity in the drawings.

The frame member A has cylindrical annular body portion 14 bridged at the outer end by an integral spider having a central inwardly open bearing socket 15 and including suitable seat formations for the brush holder units B held by clamping means. Cooling fins 16 are formed on the bearing socket. The outwardly flanged open end of the body 14 is internally rabbeted coaxially relative to the bearing socket 15 to provide an inner radial surface and inner peripheral surface bearing upon cylindrical and radial end surface portions of the stator C. Diametrically disposed enlargements or lugs 18 projecting outwardly from the body arcuately slotted coaxially relative to the rabbeted rim to receive the clamping bolts E extending toward and threaded into the second end member D, upon loosening of bolts E, permit rotational adjustment of the member A relative to the stator and hence of brushes where used.

The second frame end member D, which like the first is adapted to be formed as an integral element say by die casting, includes a centrally apertured disk portion 20 with forward face 21 forming an end wall or baffle of the suction fan housing unit J; a plurality of posts 22 extending from the rear face of the disk 20 to engage the adjacent end of the stator core at circumferentially spaced locations; a central bearing socket 23 formed by a cylindrical flange on the rear face of the disk about the disk aperture to receive the outer race of a shaft ball-bearing unit with the shaft projecting through the disk; and a cylindrical rim flange 24 offset from the disk toward the motor. Circumferentially spaced triangular buttresses 25 joining the inner side of the rim flange and back face of the disk to strengthen the rim and alternating rectangular vanes 26 extending inward to posts 22 for like purpose, all of which may be non-radial, also serve in some degree as air guides for ventilating air escaping outwardly between the spacing posts 22. The rim 24, larger in diameter than the disk portion itself, is connected to the back face of the disk at its periphery by a continuous beveled or conical web 27. Thus a continuous circumferential air passage or groove 29 results outward of the edge of disk 21. An external circumferential rib 28 dividing the surface of the rim forms shoulders against which the motor housing and fan housing cup elements abut when fitted to the rim.

The ends of the posts 22 are rabbeted forming radial and arcuate surfaces fitting corresponding cylindrical and end face portions of the adjacent stator outer end edge after the fashion of the annular body of member A. The post rabbeting, the bearing socket and the external rim portions of member D are coaxial. A groove 30 may be formed in the forward, i. e. fanward, face of disk in casting to provide a male cylindrical chucking surface for subsequent machining of rabbeting, rim and bearing socket.

The motor housing H may be of sheet metal, spun or drawn to the generally cup-shape shown, to have a main cylindrical wall 31 surrounding and spaced from the frame member A and the stator core; a cylindrical enlargement 32 at its open end fitted and held by screws on the rim 24; and, above the member A, a radial wall 33 the central portion of which is cupped outwardly to form a more or less cylindrical wall 34 around the ventilating fan V. In the radial wall of the cupped portion a plurality of perforations 35 form a ventilation inlet for air opening axially of the fan V; while for ventilation exhaust there is a series circumferentially spaced openings 36 in the cylindrical wall at a plane near mid-length of the stator core. Preferably for better air flow, as well as reasons of fabrication, curved surfaces are used for the transitions from cylindrical to radial surfaces of the housing.

In the annular partition plate P, stamped out of stiff impregnated board or fiber sheet or metal sheet, the annular width is substantially equal to the radial spacing between the main cylindrical wall 31 of the housing H and the exterior cylindrical surface portions of the stator core with clearance for easy sliding assembly of the partition to the core, and of the housing over the partition. The bolts E passing through correspondingly positioned apertures of the partition P support the latter in rotationally fixed location relative to the member D and helical compression springs 41, are interposed on the bolts E between member D and the partition, providing means associated with the motor frame for mounting the partition. The springs hold the partition against the bottom or inner end of the annular body 14 of member A. At least one tongue 42, projecting from the inner periphery of the partition plate into one of the stator grooves 11 and generally conformed in shape to the cross section of the groove, serves not only to conform the partition more closely to the exterior shape of the stator, but also in a commutator type motor, as here shown, fixes the core in rotational position relative to bolts E threaded in member D, against movement when bolts E are loosened for rotational brush adjusting movement of member A.

In the fan housing J there are two cup-shaped housing members with cylindrical walls of substantially equal diameter and centrally apertured radial end-walls merging peripherally through curved edges into the cylindrical walls. The first housing member 44 for the second stage impeller L with open cylindrical end fitted onto the outer or forward end of rim 24 and held thereon by screws, has a circumferential series of exhaust openings or louvers 46 at the level of the web 27 and peripheral edge of the disk proper opening to the passage 29, so that air drawn centrally into the second stage fan and expelled circumferentially from the fan has a circumferentially continuous path through the radial space between fan L and housing member 44, the passage 29 about the disk face edge to the louvers 46.

Secured to the outer face of the radial wall 47 of the second stage housing element 44, there is a set of spaced vanes 48 extending outwardly from a central opening 49 to the cylindrical wall 50 of the first stage housing element and supporting a centrally apertured annular plate 51 in spaced relation from the radial or end wall 52 of the first fan housing element. Plate 51 is of about the same diameter as that of the first stage fan. Hence air, drawn through suction inlet 53 to the center of first stage fan K and expelled from the circumference thereof, passes around the edge of the plate 51 and through the passages between the plate 51, wall 47 and vanes to the second fan inlet. The open cylindrical end of the first stage housing may be press fitted onto a slight reduction on the second stage element as shown.

The two fan impellers K, L are similar and of known structure, each being comprised of two spaced sheet metal disks 55, 56 of like diameter with curved impeller vanes 57 secured therebetween, one disk 55 having a large central aperture 59 about the same size as the inlet apertures of the housing elements and the second 56 disk apertured to fit the rotor shaft. The impellers are clamped at central areas and held at proper location on the rotor shaft S by the flanged face of sleeve 60 bearing endwise on the inner race of the ball-bearing unit 61 and the inner end of the spool-like spacer sleeve 62, for the second stage impeller; and by the outer end of the spacer sleeve 62 and washer 63 held by nut 64 on the threaded end of the shaft. Since the ball bearing units are lightly pressed onto the rotor shaft up to shoulder formations thereon, the clamping nut and spacers relocate the impellers on the shaft when reassembling after servicing or repair. The sleeve 62 is semicircularly grooved to present to air leaving the space between walls 47 and 51 a guiding surface directing it into the second stage impeller opening 59.

In the disclosed structure a motor cooling air flow, indicated by arrows in Fig. 1, is induced by fan V from the air inlet 35 into an upper chamber above baffle or partition P, which directs the flow through the openings around brushes and spider in member A and through the spaces between armature and stator. The air thence flows outwardly between the back of the disk portion of member D to a lower chamber below P to pass lengthwise of the stator core to exhaust openings 36. The biasing springs 41 in pressing the plate P against the circular flat bottom edge of member A give an adequate joint therebetween for present purposes. The air flow in bathing end member A and the back of member D with its several projecting portions effectively dissipates bearing heat, while the internal and external contact of the air stream thoroughly cools the stator core and windings as well as the rotor. The conoidal shape of the web 27 at the forward face of member D at groove 29 aids in directing the suction air flow, indicated by arrows, from the second stage fan to exhaust openings 46. The latter preferably are louvers, formed by shearing the metal along a line and bowing outwardly into a "scoop" shape the area lying on that side of the shear line toward the approaching fan edge.

In assembly, the usual dust-seal felt and washer group are placed in the bearing socket of member D; the stator is placed on the posts thereof; the partition plate P is slipped onto the stator core, member A is placed on the end of the latter, and the core and member A are adjusted until the slotted lugs 18, the threaded apertures of member D for bolts E, and the bolt apertures in the plate P are aligned. Each bolt E is then run through corresponding spring 41, previously inserted between the partition and member D, into threaded clamping engagement with the latter, completing assembling of motor frame elements A, C, D, E. The fan V may then be secured on the rotor shaft. After the fan housing and fans are added to the assembly, when the unit is tested for performance, the brush position is easily adjusted in the case of a commutator motor by merely loosening bolts E and turning member A and retightening, since the partition plate through tongue 42 and bolts E holds the stator in position. After any required brush adjustment, the housing H is placed over the motor elements and slipped onto the rim of member D as a base.

Hence the partition and its self-locating resilient mounting structure represent a simple provision of a dividing wall or baffle, not readily subject to damage in assembling or servicing nor entailing the additional costs involved in use of an element incorporated in housing H, the stator or end member A. The overall structure of the assembly is therefore quite simple yet effective; and easily mounted, for example as shown by the dashed lines in Fig. 1, between sealing pads or gaskets 66, 67, 68 in the enclosing top structure of a tank cleaner embracing respectively the shoulder of housing H between rim and exhaust louvers, and the bottom curved edge of the fan housing F, and bearing on the endwall of housing H adjacent 34, which keep the lateral suction exhaust stream removed from the cooling air intake stream at the top of the unit. The axial spacing of the several intake and exhaust openings thus may simplify design considerations for the vacuum cleaner tank structures.

I claim:

1. In a vacuum cleaner electric motor-suction fan unit including an armature, a field core, two motor frame end members on opposite core ends supporting the shaft of the armature, a first one of said members mounting motor brushes and the second member in diameter greater than the first mounting a suction-fan assembly having air flow space isolated from the motor space, and frame bolts exterior of the core engaging said members to clamp the same on the core in rotationally adjusted position, that improvement comprising: a motor ventilating fan mounted on the shaft outboard of said first member, a cup-shaped motor housing having open end fitted on the periphery of said second member and closed end apertured to provide cooling air inlet means to said fan, said housing having a series of circumferentially spaced cooling air outlet openings, said series being axially spaced down the core length away from said second member toward the first, an annular partition plate extending radially between said core and housing, said plate being engaged in rotational sense with said core and said bolts and axially free of said bolts, and compression spring means on said bolts urging said plate away from the second member beyond said series into abutment with the first member to define a cooling air path axially inward between armature and field and in axially reversed sense outward exteriorly of the field.

2. In a vacuum cleaner, an electric motor-suction fan assembly with forced air cooling of the motor elements and having separate paths for the suction and cooling air streams comprising: an electric motor unit including a rotor, a core of lamination secured together and wound to form a stator, a frame member fitted on one end of the stator core with the rotor shaft projecting therethrough and having openings for cooling air access between stator and rotor, ventilating fan means on the projecting shaft end, a second frame member fitted on the other end of the stator core having a radially extended disk portion spaced from the stator with the other end of the shaft extending therethrough and a rim portion circumferentially continuously connected with the disk, said second frame member having lateral outlets for air passed between stator and rotor, longitudinal frame bolts exterior of the core extending between said frame members, a cup-shaped housing with closed end apertured to provide a ventilating air inlet to said fan and with open end fitted and secured to said rim portion, said housing having circumferentially spaced air outlets located radially of the stator core end adjacent the first said frame member, an annular partition plate surrounding the stator core and extending radially of the shaft axis toward said housing, said plate being mounted on said bolts and spring biased toward the first member to an axial position between said inlet and outlet openings, and a suction fan unit including a cup-shaped element with open end secured to said rim opposite the motor housing forming a fan housing with the second frame member and having an axial suction air inlet and peripheral outlet means, and a suction fan mounted on the motor shaft outboard of the second frame member.

3. A forced air cooled electric motor assembly comprising a stator core having a longitudinal groove in its external surface, a commutating rotor in the stator having a shaft, a disk member having a rim portion and spacing means projecting from one face thereof to engage one end of the stator core with openings between the core and disk, said disk member supporting one end of the rotor shaft as an end frame element of the motor unit, an opposed end frame member carrying commutator brushes mounted on the other end of the stator core and including radial projections with arcuate slots and a spider structure supporting the other shaft end projecting therethrough, the second named member being rotatable about the axis of said shaft for brush adjustment relative to the stator, a motor cooling fan on the projecting end of the shaft, frame bolts extending through said slots and lengthwise and exteriorly of said core for clamping the said members together on said core, a cup-like motor housing having an open end mounted on said rim and an inlet opening to said fan through an opposite end wall and circumferentially spaced exhaust openings located radially of the stator core near the second named member, an annular partition plate surrounding said core extended radially beyond said second named member into proximity with said housing, said plate lying against the second named member and being slidable lengthwise upon said bolts and having an internal projection engaged in said groove whereby the stator is locked against rotation relative to the disk member, and spring means on said bolts interposed between the disk member and said plate to urge the latter toward the second named frame member.

4. In a vacuum cleaner, an electric motor-suction fan assembly with forced air cooling of the motor elements and having separate paths for the suction and cooling air streams comprising: a stator core for a motor unit of the assembly, a commutating rotor in the stator having a shaft, a first end frame member having arcuately slotted radial projections rotatably mounted on the one end of the stator core and including a spider structure supporting the commutator end of the shaft to project therethrough and carrying brushes for the rotor commutator, a motor ventilating fan on the shaft outboard of said frame member, a second frame end member including a disk portion having spacing means extending from one face thereof to engage the second end of the stator core with openings between the core and disk and a rim portion about the disk with a diameter greater than the first member, said disk portion supporting the second end of the rotor shaft to project therethrough, frame bolts extending through the slotted projections lengthwise and exteriorly of said core clamping the said members together on said core at rotational relatively adjusted positions, motor housing means having a generally cylindrical wall with an open end fitted and secured on said rim and an end wall with an inlet opening to said fan, an annular partition plate extending radially between said core and said cylindrical wall and lying against the first said frame member to direct cooling air from said fan between rotor and stator, said plate being axially slideable upon and engaged against rotation by said frame bolts, the outer periphery of said stator and inner periphery of said plate being mutually engaged against relative rotation, compression spring means on said bolts interposed between the second frame member and said plate to urge the latter toward its position against said first frame member, said housing having a series of circumferentially spaced exhaust openings in the cylindrical wall radially opposite the stator core, said series being axially spaced inward along the core from said second frame member, suction fan housing means including said second frame member as an end wall element and also having an opposed end wall with central suction air inlet and a cylindrical wall fitted and secured to said rim opposite the motor housing means, said cylindrical wall having circumferentially spaced suction air exhaust openings adjacent said rim, and a centrifugal fan mounted on said shaft within the fan housing means.

5. In a vacuum cleaner, an electric motor-suction fan assembly with forced air cooling of the motor elements and having separate paths for the suction and cooling air streams comprising: a stator core for a motor unit of the assembly, a rotor in the stator having a shaft, a first end frame member mounted on the one end of the stator core including a spider structure supporting the one end of the shaft to project therethrough and also having portions projecting radially beyond said core, a motor ventilating fan on the shaft outboard of said frame member, a second frame end member including a disk portion having spacing means extending from one face thereof to engage the second end of the stator core with openings between the core and disk and a rim portion about the disk with a diameter greater than the first member and joined to the disk by an integral beveled circumferentially continuous web, said disk portion supporting the second end of the rotor shaft to project therethrough, frame bolts extending lengthwise and exteriorly of said core clamping the said members together on said core, motor housing means having a generally cylindrical wall with an open end fitted and secured on said rim and an end wall with an inlet opening to said fan, an annular partition plate extending radially between said core and said cylindrical wall and lying against the first said member to direct cooling air from said fan between rotor and stator, said plate being axially slideable relative to said bolts, compression spring means on said bolts interposed between the second frame member and said plate to urge the latter to its position against said first frame member, said housing having a series of circumferentially spaced exhaust openings in the cylindrical wall radially opposite the stator core, said series being axially spaced inward along the core from said second frame member, suction fan housing means including said second frame end member as an end wall element and also having an opposed end wall with central suction air inlet and a cylindrical wall fitted and secured to said rim opposite the motor housing means, said cylindrical wall of the fan housing defining with said web a circumferential air channel and having circumferentially spaced suction air exhaust openings radially adjacent said channel, and centrifugal fan means mounted on said shaft within the fan housing means.

References Cited in the file of this patent
UNITED STATES PATENTS

| | | |
|---|---|---|
| 1,918,695 | Gilbert | July 18, 1933 |
| 2,184,446 | Snyder | Dec. 26, 1939 |
| 2,713,455 | Cole | July 19, 1955 |